March 17, 1970   D. A. ROSE   3,501,156
JOURNAL BOX SEAL
Original Filed Nov. 29, 1965   2 Sheets-Sheet 1
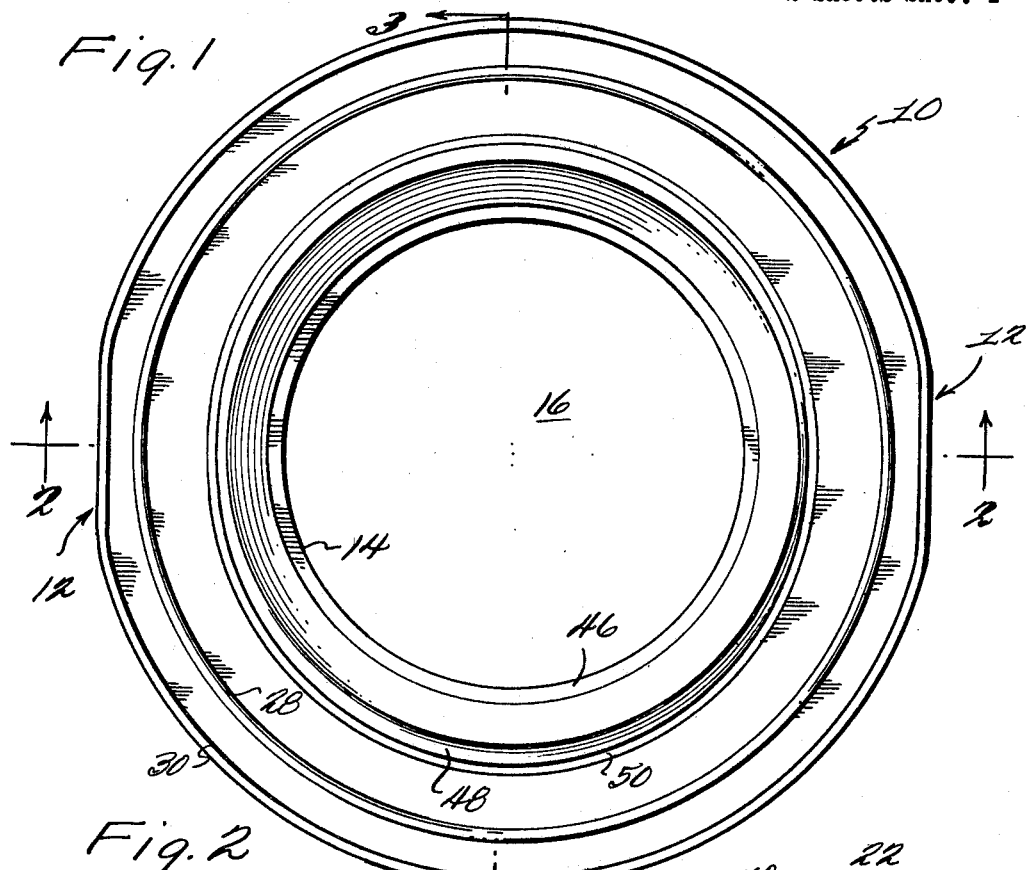
Fig. 1
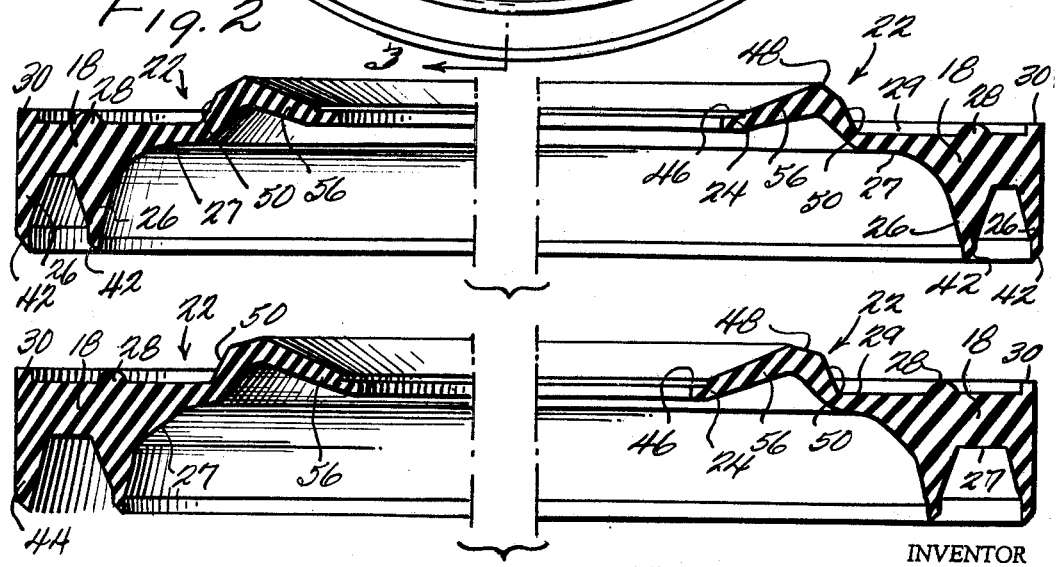
Fig. 2
Fig. 3
INVENTOR
DAVID ALLEN ROSE
BY Cushman, Darby & Cushman
ATTORNEYS March 17, 1970 D. A. ROSE 3,501,156
JOURNAL BOX SEAL Original Filed Nov. 29, 1965 2 Sheets-Sheet 2

INVENTOR
DAVID ALLEN ROSE
BY
Cushman, Darby & Cushman
ATTORNEYS

United States Patent Office 3,501,156
Patented Mar. 17, 1970

3,501,156
JOURNAL BOX SEAL
David A. Rose, Littleton, Colo., assignor to Superior Seal Devices, Littleton, Colo., a company of Colorado
Continuation of application Ser. No. 510,257, Nov. 29, 1965. This application Sept. 30, 1968, Ser. No. 766,375
Int. Cl. F16j 15/32, 15/54
U.S. Cl. 277—130
3 Claims

ABSTRACT OF THE DISCLOSURE

A ring seal for use in a railway journal box dust guard well, said ring seal having a body portion and a lip portion disposed radially inwardly of said body portion, said lip portion having an inner and outer surface and a lubricant-receiving recess portion formed on said inner surface adjacent the inner periphery of said lip portion, at least a part of said inner surface being constructed for disposition in sealing engagement with the axle whereby said recess portion is maintained in communication with the interior of the journal box when said ring seal is installed in the journal box and around the axle. The body portion of the ring seal is constructed from a flexible material and has annular fin means formed on the first side thereof and annular bead means formed on the second side thereof, said bead means projecting outwardly an amount substantially less than said fin means. The lower portion of the annular fin means has a larger cross sectional area than the upper portion thereof. The lip portion is tapered in configuration and said inner and outer surfaces are formed convergently in a direction proceeding radially inwardly whereby, in the unflexed position of said lip portion, an extension of said inner surface forms an included angle of approximately fifteen degrees with a plane disposed substantially perpendicular to the longitudinal axis of the ring seal and an extension of said outer surface forms an included angle of approximately ten degrees with a plane disposed substantially perpendicular to the longitudinal axis of said ring seal. The lip portion and the body portion are interconnected by a web portion. The wheel side of the body portion intersects the adjacent surface of the web portion at an angle substantially larger than ninety degrees.

---

This invention relates to an improved seal for use in journal boxes of railroad cars and in particular the invention provides for an improved construction of a journal box seal which functions both as a dust guard and as a seal for keeping out liquids and fluids.

Journal box seals for railroad cars are generally well known in the art, and various constructions have been provided to attempt to solve many of the problems which are inherent in such a sealing situation. In the conventional journal box construction a car axle journal enters the journal box through an opening which is necessarily larger than the diameter of the entering axle. The relatively large diameter of the opening in the journal box permits a limited amount of movement of the axle with respect to the journal box, and because of this movement it is necessary to provide a seal which effectively closes off the annular space which exists between the axle and the journal box opening.

Prior to this invention various sealing rings have been inserted about the axle and in contact with the journal box for closing the space therein. These sealing ring constructions have most often included an outer body portion which is insertable in a dust well portion of the journal box, and in addition the sealing ring includes a flexibile interior lip which is adapted to surround and contact the axle portion passing through the journal box opening. Prior constructions have attempted to provide an adequate sealing of the journal box to prevent the entry of dust and other foreign matter into the journal box while at the same time preventing the exit of oil therefrom.

Although the prior sealing rings have afforded a certain amount of dust sealing function, they have not been totally adequate for keeping out all foreign matter, including liquids such as water, as well as dust. The present invention provides for a journal box seal which is especially adapted for use as a journal box rear seal. The ring seal of this invention includes an outer diameter body portion which is insertable within a dust well, and its associated structure, of a journal box, and the ring also includes an interior diameter lip portion which contacts an axle so as to seal the space between the axle and an opening through which the axle passes for entry into the journal box. The body portion of the ring includes a web which carries sealing fins and sealing projections on opposed faces for establishing a tight seal in the dust well section of the journal box. The sealing fins project toward the interior of the journal box for preventing the escape of oil out of the box, and the opposed sealing projections face in an opposite direction for preventing the entrance of dust or liquids into the journal box. The projections and fins are of such a construction that a vacuum type of seal is established where the web portion of the sealing ring contacts upright wall portions around the jounal box opening. The vacuum seal eliminates the prior difficulty of maintaining a liquid tight sealing arrangement for such journal box openings.

The flexible lip portion of the sealing ring is adapted to be flexed and placed against the surface of an entering axle so as to maintain its flexed position. In this flexed position, the lip can accommodate changes in the opening between the axle and the remainder of the journal box while maintaining a sealing contact of an end portion of the lip with the entire circumference of the axle. The lip is constructed in a particular way to assist in the deflecting of dust and dirt particles away from the journal box opening when the lip is in its flexed, mounted position, and the lip is provided with an oil retaining construction which maintains a film of oil around the axle where the lip is in contact with the axle. This latter feature provides a better seal around the rotating axle, and also functions to cool the engaging portions of the seal and the axle, thus resulting in a longer life of the seal.

These and other advantages of the journal box seal of this invention will become apparent in the more detailed discussion which follows and in that discussion reference will be made to the accompanying drawings in which:

FIGURE 1 is a plan view of the journal box seal of this invention;

FIGURE 2 is a cross-sectional elevation of the seal taken at line 2—2 of FIGURE 1;

FIGURE 3 is a cross-sectional elevation of the journal box seal taken at line 3—3 of FIGURE 1.

Figure 4:
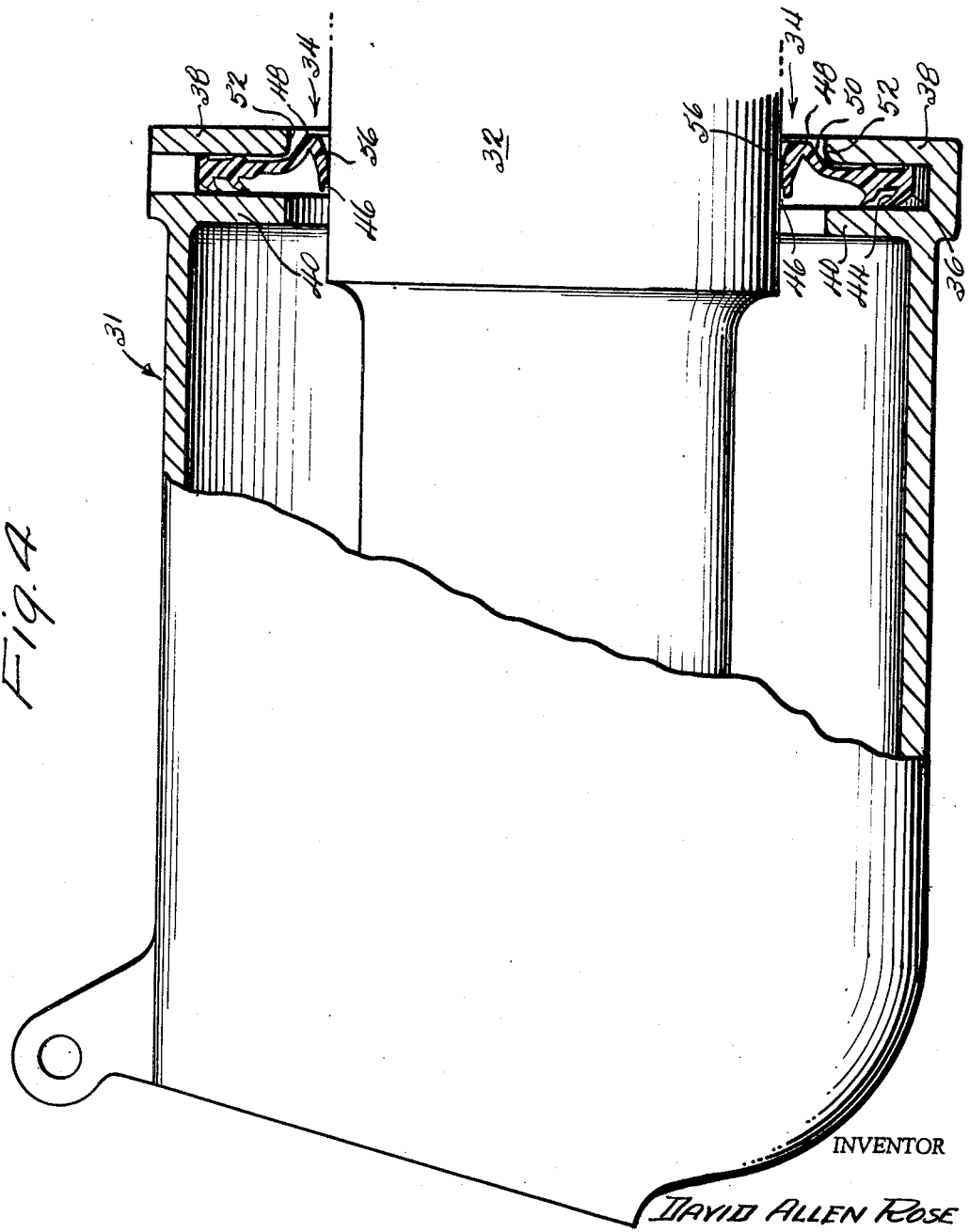
FIGURE 4 is an elevational cross section of a journal box with the seal of this invention installed in its sealing position between an axle and the remainder of the journal box in the region of a journal box opening.

The journal seal of this invention is in the form of a ring having a circular opening therethrough, and the ring is substantially flat in a plane which will be a vertical plane when the ring seal is installed in a journal box. The journal box seal is preferably manufactured from a neoprene compound which is highly resistant to oil, heat and water, and the entire seal is impregnated with molybdenum to give the seal a longer life and better lubrication characteristics.

Referring to FIGURE 1, the journal box seal 10 is illustrated in a plane view looking toward the outer face of the seal as it would be seen in an upright position for mounting. The seal 10 is generally ring-shaped, however, flattened side margins 12 are provided to prevent rotation of the seal when it is mounted in a sealing position around an axle entering a journal box. The flat margins 12 mate with similar flat surfaces contained within a dust guard well of the journal box where the seal is installed. The ring seal 10 has an outer diameter which defines the largest size of opening within which the seal will be positioned. Further, an interior circumference 14 defines the inner diameter of the ring seal central opening 16, and that opening is slightly smaller in diameter than the diameter of an axle to be contained therethrough. For example, when the axle diameter is 6 5/16 it has been found that a diameter of 6 5/8 for the opening 16 provides the requisite amount of sealing contact between the ring seal 10 and the axle. In the FIGURES 1, 2 and 3, the ring seal is illustrated in its relaxed unmounted position, whereas the seal is shown in its flexed and mounted position in FIGURE 4.

FIGURES 2 and 3 illustrate cross-sectional views of the journal box seal of this invention and the two views are taken along separate axes of the FIGURE 1 illustration, as indicated. It will be appreciated that the outside diameter of the ring seal taken at the axis 2—2 is less than the outside diameter of the ring seal taken at the axis 3—3 because of the flattened side margins 12.

The ring seal includes an outer body portion 18 which is adapted to be inserted and contained within a dust well portion of a journal box, and for this reason the body portion 18 is constructed of relatively thick material to provide efficient rigidity of the seal for its insertion and contact with the dust well structure of the journal box. Considering the ring seal to be formed in a horizontal plane as viewed in FIGURES 2 and 3, it can be seen that the seal includes a lip portion 22 which is generally coextensive with the horizontal plane of the body portion 18. The lip portion 22 extends inwardly toward the central opening 16 and terminates in an edge 24. The particular structure of the lip portion 22 as related to the body portion 18 is very important to this invention, and will be discussed in greater detail below.

The body portion 18 of the seal includes fin members 26 which project inwardly toward the interior of the journal box when the seal is in its mounted position. The fin members 26 are continuous and annular and project at substantially right angles away from the back face of the seal, as illustrated. The body portion 18 also includes annular projecting members 28 and 30 on a front face of the seal, and these projecting members function to provide a fluid-tight contact of the front body face of the seal with a portion of the journal box.

The lip portion 22 of the ring seal is formed from material which is thinner in its cross section than the cross section of the body portion 18. The lip portion is adapted to be flexed inwardly toward the interior of the journal box when the seal is placed around an axle member, and further, flexing of the lip is required in operation when the axle member moves relative to the opening in the journal box. Accordingly, the sealing lip 22 is constructed to provide the requisite amount of flexing while at all times maintaining a tight sealing contact of the lip edge 24 with the surface of the revolving axle member. Also, the lip portion is constructed to provide sealing and strength characteristics which have not been provided in prior sealing devices, and the particular construction of the lip 22 will be discussed with reference to the installed position of the seal, as illustrated in FIGURE 4.

FIGURE 4 shows a journal box 31 with an axle member 32 passing through an opening 34 of the journal box so that a journal portion of the axle can be carried by a bearing within the journal box. The journal box 31 is of a conventional construction, and does not form a part of this invention. The usual bearing structure has been omitted from the drawing for clarity, however a typical construction for a bearing of this type is illustrated in Bigelow Patent 2,177,606 granted on Oct. 24, 1939. The journal box 31 includes a dust well section 36 which is formed by the spaced upright walls 38 and 40. The outer wall 38 is parallel to and spaced from an inner wall 40 so as to define a channel around the entire journal box opening 34. The channel or dust well portion of the journal box is conventionally open at the top so that a sealing ring can be inserted in and contained within the channel for engagement with an axle member 32 which is operating through the opening of the journal box.

Although prior art sealing devices have been designed for insertion in a dust well portion of a journal box, such devices have not been totally effective in sealing the journal box and an axle passing therethrough relative to one another. In the conventional dust seal which has been used in the past, a body portion of the seal is fitted into the dust well of a journal box, and a flexible lip portion generally surrounds and contacts the axle. Such devices have served mainly to prevent the escape of some of the lubricating oil from within the reservoir section of the journal box while preventing the entry of dust into the journal box. The ring seal of this invention has been constructed to effectively provide a fluid-tight seal which prevents escape of any oil from within the journal box while preventing the entry of any foreign matter, including liquids, into the journal box. The effective sealing characteristics of the present invention are a result of specific constructional features of the seal device, which will now be described with reference to the mounted position of the seal as shown in FIGURE 4 and to the detailed views of the seal as shown in FIGURES 2 and 3.

The body portion 18 of the seal is adapted to be inserted within the channel or dust well 36 of the journal box. Specially constructed fins 26 project from a back face 27 of the body portion 18 and are directed inwardly toward the journal box when the seal is installed. The fins 26 project for such a distance that they will be flexed when inserted into the dust well 36. This flexing of the fins causes a tighter engagement of the projecting members 28 and 30 on the opposite face of the body 18 with the upright wall 38 of the dust well. The fins 26 include tapered faces 42 at their outer ends, and these faces are placed at approximately a 45° angle to the plane of the relaxed seal, as shown in FIGURES 2 and 3, so that the faces 42 will be flexed to match the vertical plane of the upright wall 40 in the dust well when the seal is installed. This feature provides for a much tighter engagement and a more effective fluid-tight seal when the seal 10 is installed. The lowermost portion of the outer fin 26 is constructed to be made of a thicker material than the remainder of the same fin. This portion of the fin is illustrated in FIGURE 3 at 44, and its installed position is shown in FIGURE 4. The additional thickness 44 of the fin 26 at this lower level of the installed seal provides for additional pressure of the seal at the lower portion, and this prevents leakage of oil from that part of the seal. The journal box normally contains a quantity of oil in its bottom portion and some of this oil spills over into the lower part of the dust well 36. The increased thickness of fin 26 at 44 is at a maximum thickness at the lowermost position of the installed seal and the fin then tapers to a normal size as it approaches the margins 12. The extra thickness also provides for additional resistance to deterioration from the oil which collects in the bottom of the dust well 36.

A front face 29 of the body 18 of the ring seal includes the outwardly projecting members 28 and 30 which are spaced substantially parallel from one another and are formed to be continuous annular rings having no interruptions in their projecting surfaces. Because of the flexed positions of the fins 26 against the inner wall 40, the outer projecting members are pushed tightly against an inner surface of the outer wall 38. It has been found that the tight engagement of the projecting rings 28 and 30 against the outer wall 38 forms a partial vacuum type of seal between the body 18 and the outer wall 38. This vacuum-tight seal prevents the entry of any foreign matter, such as dust or even water, into the dust well or the interior of the journal box. Prior dust rings, and the like, have not effectively provided such a liquid-tight seal, and have usually provided only a flat surface of a seal body member for abutment against the outer wall of a dust well. Such prior construction have not succeeded in preventing the entry of water into a journal box. Although the theory for the vacuum type of seal is not entirely established, it is believed that the particular cross-sectional configurations of the projecting members 28 and 30, as related to each other, play an important role in the unusually good results obtained. The outer projecting member 30 has a flat outer face which establishes a broad sealing engagement with the inner surface of the upright wall 38 when the seal is installed. The inner projecting member 28 has a rounded outer surface and is adapted to slide over the surface of the upright wall 38 when the seal is installed. Thus, when the ring seal 10 is inserted in the dust well channel of a journal box the two projecting members take up sealing positions against the inner surface of the wall 38. However, as the edge 24 of the lip portion of the seal is flexed around an axle, there is a slight pull on the body portion 18 of the sealing ring. Since the projecting member 30 is more firmly established in its contact with the surface of the wall 38, than is the projecting member 28, there is a relative movement of the projecting member 28 away from the member 30. This slight movement produces and maintains a partial vacuum between the two annular members 28 and 30, and a much tighter fluid seal results.

When the journal box seal is in its installed position, the body 18 is contained entirely within the space between the annular walls 38 and 40 of the journal box, and the lip portion of the seal projects inwardly toward the axle member as shown. Because the opening 16 through the seal is smaller in diameter than the diameter of the axle 32, the edge 24 of the lip portion of the seal is flexed inwardly toward the journal box (in a direction along the longitudinal axis of the axle 32) to form a tight sealing engagement of the lip edge with the surface of the axle member. The improved journal seal of this invention provides a recess 46 in an outer surface of the lip portion near the edge 24 of the lip. As illustrated in FIGURE 4, this outer surface section lies substantially parallel to the longitudinal surface of the axle when the seal is flexed into its installed position, and accordingly the recess 46 is placed entirely around the axle surface where the lip surface contacts the axle. The recess provides a means for containing lubricating oil in the surface of the lip 24 where it engages the surface of an axle 32. By maintaining an oil film at this point of contact between the journal seal and the axle, a better sealing action is provided and the oil ring serves to reduce the temperature of the seal which results from its frictional contact with the axle. It has been found that the lip of a journal seal constructed in this manner is substantially increased by the lowering of the temperature of the seal during its operating life.

The remainder of the lip 22 between its innermost edge 24 and its coextensive juncture with the body 18 is constructed to provide certain annular surfaces which improve the performance and life of the journal seal. As seen in FIGURES 2 and 3 the relaxed journal seal includes a portion of the lip 22 which extends upwardly away from the main horizontal plane of the front face 29 of the seal. This intermediate portion of the lip 22 becomes flexed as shown in FIGURE 4 when the seal is installed. In the flexed position, the intermediate portion of the lip presents a substantially annular flat surface 48 which is in a vertical plane at right angles to the longitudinal axis of the axle 32. This flat surface 48 provides a means for deflecting dust particles and other solid matter away from the space 34 which exists between the outer wall 38 of the journal box and the axle which is carried into the journal box. The flat surface 48 is constructed to cover a major portion of that space and serves to deflect away particles or dust particles which might otherwise enter the space and move into the area of the dust well. The flat surface 48 is preferably elliptical in shape to match the conventional elliptical opening of a journal box, and this elliptical shape cooperates with the margins 12 to prevent a turning or twisting of the seal and the sealing lip about the axle. Further, the elliptical configuration assures a deflection of substantially all dust particles away from the entire circumference of the opening 34.

The intermediate lip portion 22 also includes a wall section or web 50 which interconnects the flat surface 48 and the front face 29 of the main body portion of the seal. This wall 50 is constructed at an angle to the flat surface 48 and the front face of the main body 18. The angular relationship of the wall 50 to the front face of the seal is such that when the lip if flexed into its operating position, there is provided a space between the wall 50 and an edge 52 of the steel dust well wall 38. If the wall 50 were to rest in a face to face position on the edge 52 of the wall 38, there would be a certain amount of abrasion and shock to the lip 22 during movements of the axle 32 relative to the remainder of the journal box. By providing a small space between the wall 50 and the edge 52, a greater degree of flexing is provided for the seal with less likelihood of abrasion and fatigue from an impact with the metal material of the wall 38. It has been found that by providing an angular relationship greater than 90 degrees between the wall 50 and the front face of the seal when the seal is in its installed position a greater degree of flexing and less abrasion of the entire journal seal results.

A further feature of this invention resides in the tapered configuration of the inner portion 56 of the lip 22. The tapered portion 56 relieves excessive pressure and fatigue on the sealing edge 24 when that edge is compressed around an axle member, and this increases the useful life of an installed seal. It has been found that when a seal is constructed without this taper, considerable breaking or splitting occurs during impact or general service of railroad cars. The preferred taper includes a surface angle on the wheel side of the seal of approximately 16 degrees to a horizontal plane as viewed in FIGURES 2 and 3. The degree of taper on the journal box side of the seal is approximately 10 degrees to the same horizontal plane.

Having described the particular construction of the journal seal of this invention it can be seen that a substantially improved sealing device is provided which attains functions not provided in the prior art. The sealing ring has unusual characteristics of long life due to the provision of a temperature reducing oil retaining recess on its axle engaging portion, and other constructional features are provided to reduce excessive fatigue and shock to the seal in its operating position. Further, the improved ring seal of this invention provides for opposed sealing fins and projecting members which cooperate with each other when inserted in a dust well of a journal box to form a very effective fluid-tight seal in that area. The fins are constructed to be flexed into engagement with the inner dust well wall with flat surfaces providing a tight seal against that wall, and a lower portion of the fin which contacts oil within the dust well is constructed to resist deterioration from such contact. Although the invention has been described with reference to a preferred embodiment, variations will become obvious to those

What is claimed is:

1. In a ring seal adapted to be inserted in a railway journal box dust guard well having opposed interior walls and with an axle disposed through central openings formed in the dust guard well and in said ring seal, said ring seal having a body portion and a lip portion disposed radially inwardly of said body portion, said body portion being constructed for insertion between the opposed interior walls of the dust guard well of the journal box and said lip portion extending around said axle toward said journal box, the improvement comprising:

a body portion having annular fin means formed on a first side thereof and projecting outwardly therefrom and annular projecting means formed on a second side thereof for seating on an adjacent interior wall of a dust guard well and projecting outwardly in a direction opposite to the projecting direction of said annular fin means, said annular projecting means cooperating with said annular fin means to provide fluid tight engagement of said body portion against the opposed interior walls of the journal box dust guard well when said ring seal is mounted in the journal box dust guard well;

said lip portion having
an inner and outer surface at least a part of said inner surface being constructed for disposition in sealing engagement with said axle,
a lubricant-receiving recess portion formed on said inner surface adjacent the inner periphery of said lip portion, said recess portion being maintained in communication with the interior of the journal box when said ring seal is installed in the journal box dust guard well and around the axle, said recess portion thereby being adapted to receive lubricant from said journal box to cool the sealing engagement portion of said lip, and
a tapered portion which terminates at the inner periphery of said lip portion with the thinnest part of said tapered portion being formed at the termination of said inner edge, said tapered portion including inner and outer surfaces, said inner and outer surfaces being convergently formed in a direction proceeding radially inwardly whereby, in the unflexed position thereof, an extension of said inner surface forms an included angle of approximately fifteen degrees with a plane disposed substantially perpendicular to the longitudinal axis of the ring seal and an extension of said outer surface forms an included angle of approximately ten degrees with a plane disposed substantially perpendicular to the longitudinal axis of said ring seal.

2. In a ring seal as described in claim 1 in which said annular fin has a lower segment thereof adapted to be disposed in an oil retaining portion of said well and wherein:

the lower segment of said annular fin means has a larger cross sectional area than the remainder thereof.

3. In a ring seal as described in claim 1 in which said lip portion and said body portion are connected by a web portion having a substantially annular flat surface thereof adapted for location in a plane at right angles to the axis of said axle and interconnecting said inner surface of said lip to said second side of said body for deflecting dust particles and other solid matter away from said ring seal; and wherein said second side of said body portion intersects said annular flat surface of said web portion at an angle substantially greater than ninety degrees thereby increasing substantially the amount of flexing of said lip portion in a radial direction without contacting the edge of the adjacent wall of the dust guard well.

References Cited

UNITED STATES PATENTS

| | | | |
|---|---|---|---|
| 2,487,669 | 11/1949 | Pattullo et al. | 277—131 |
| 2,758,853 | 8/1956 | Beck. | |
| 2,958,551 | 11/1960 | Rogers | 277—237 |
| 3,022,097 | 2/1962 | Seniff et al. | |
| 3,069,179 | 12/1962 | Johnson | 277—130 |
| 3,214,179 | 10/1965 | Dega | 277—134 X |
| 3,250,541 | 5/1966 | McKinven | 277—152 X |

FOREIGN PATENTS

| | | |
|---|---|---|
| 112,851 | 1/1945 | Sweden. |
| 679,880 | 2/1964 | Canada. |

SAMUEL ROTHBERG, Primary Examiner